(12) United States Patent
Tseng et al.

(10) Patent No.: US 10,114,251 B2
(45) Date of Patent: Oct. 30, 2018

(54) LIQUID CRYSTAL DISPLAY HAVING HOLDING MEMBER AND METHOD OF FABRICATING SAME

(71) Applicant: a.u. Vista Inc., Milpitas, CA (US)

(72) Inventors: Wen-Hsien Tseng, Hsinchu (TW); Seok-Lyul Lee, Hsinchu (TW); Fang-Chen Luo, Milpitas, CA (US)

(73) Assignee: A.U. VISTA, INC., Milpitas, CA (US)

( * ) Notice: Subject to any disclaimer, the term of this patent is extended or adjusted under 35 U.S.C. 154(b) by 147 days.

(21) Appl. No.: 14/973,391

(22) Filed: Dec. 17, 2015

(65) Prior Publication Data

US 2017/0176828 A1  Jun. 22, 2017

(51) Int. Cl.
| | | |
|---|---|---|
| *G02F 1/1339* | (2006.01) | |
| *G02F 1/1362* | (2006.01) | |
| *G02F 1/1368* | (2006.01) | |
| G02F 1/1337 | (2006.01) | |
| G02F 1/1341 | (2006.01) | |
| G02F 1/1333 | (2006.01) | |

(52) U.S. Cl.
CPC ........ *G02F 1/13392* (2013.01); *G02F 1/1368* (2013.01); *G02F 1/13394* (2013.01); *G02F 1/136209* (2013.01); *G02F 1/1341* (2013.01); *G02F 1/133723* (2013.01); *G02F 1/133788* (2013.01); *G02F 1/136286* (2013.01); *G02F 2001/133354* (2013.01); *G02F 2001/136222* (2013.01)

(58) Field of Classification Search
CPC ............ G02F 1/13392; G02F 1/13394; G02F 1/136209
See application file for complete search history.

(56) References Cited

U.S. PATENT DOCUMENTS

| | | |
|---|---|---|
| 5,621,553 A | 4/1997 | Nishiguchi et al. |
| 5,668,651 A | 9/1997 | Yamada et al. |
| 5,929,960 A | 7/1999 | West et al. |
| 6,689,629 B2 | 2/2004 | Tsujimura et al. |
| 6,818,967 B2 | 11/2004 | Chen |
| 6,956,631 B2 | 10/2005 | Wu et al. |
| 7,125,157 B2 | 10/2006 | Fu et al. |
| 7,170,092 B2 | 1/2007 | Lai et al. |
| 7,507,612 B2 | 3/2009 | Lai et al. |
| 7,557,895 B2 | 7/2009 | Sawasaki et al. |
| 7,652,285 B2 | 1/2010 | Chen |
| 8,202,748 B2 | 6/2012 | Sasabayashi et al. |

(Continued)

FOREIGN PATENT DOCUMENTS

| | | |
|---|---|---|
| JP | 2001133792 A | 5/2001 |
| TW | 373091 | 11/1999 |

*Primary Examiner* — Dung Nguyen
(74) *Attorney, Agent, or Firm* — Tim Tingkang Xia, Esq.; Locke Lord LLP

(57) ABSTRACT

A pixel structure having a light transmitting region and a light shielding region usable in an liquid crystal display includes a first substrate having a counter electrode, a second substrate having a plurality of signal lines, a pixel electrode, a thin-film transistor (TFT) and a bottom black matrix, a liquid crystal layer having liquid crystal molecules and formed between the first substrate and the second substrate, and a holding member formed in the light shielding region and attached to the first substrate and the second substrate.

11 Claims, 20 Drawing Sheets

(56) References Cited

U.S. PATENT DOCUMENTS

| | | | |
|---|---|---|---|
| 9,086,599 B2* | 7/2015 | Roh | G02F 1/133707 |
| 9,348,171 B2* | 5/2016 | Roh | G02F 1/133707 |
| 2005/0140858 A1* | 6/2005 | Park | G02F 1/13394 |
| | | | 349/110 |
| 2006/0049380 A1 | 3/2006 | Sha et al. | |
| 2006/0209246 A1 | 9/2006 | Kim | |
| 2010/0053527 A1 | 3/2010 | Hsieh et al. | |

* cited by examiner

LIQUID CRYSTAL DISPLAY HAVING HOLDING MEMBER AND METHOD OF FABRICATING SAME

FIELD OF THE DISCLOSURE

The disclosure relates generally to display technology, and more particularly to a liquid crystal display (LCD) having a holding member and a method of fabricating the same.

BACKGROUND OF THE DISCLOSURE

The background description provided herein is for the purpose of generally presenting the context of the present disclosure. The subject matter discussed in the background of the disclosure should not be assumed to be prior art merely as a result of its mention in the background of the disclosure. Similarly, a problem mentioned in the background of the disclosure or associated with the subject matter of the background of the disclosure should not be assumed to have been previously recognized in the prior art. The subject matter in the background of the disclosure merely represents different approaches, which in and of themselves may also be disclosures. Work of the presently named inventor(s)/applicant(s), to the extent it is described in the background of the disclosure, as well as aspects of the description that may not otherwise qualify as prior art at the time of filing, are neither expressly nor impliedly admitted as prior art against the present disclosure.

LCDs are widely used in electronic devices, such as laptops, smart phones, digital cameras, billboard-type displays, and high-definition televisions.

LCD panels may be configured as disclosed, for example, in Wu et al., U.S. Pat. No. 6,956,631, which is assigned to AU Optronics Corp., the parent company of the assignee of the current application, and hereby incorporated by reference in its entirety. As disclosed in Wu et al. FIG. 1, the LCD panel may comprise a top polarizer, a lower polarizer, a liquid crystal cell, and a back light. Light from the back light passes through the lower polarizer, through the liquid crystal cell, and then through the top polarizer. As further disclosed in Wu et al. FIG. 1, the liquid crystal cell may comprise a lower glass substrate and an upper substrate containing color filters. A plurality of pixels comprising thin film transistor (TFT) devices may be formed in an array on the glass substrate, and a liquid crystal compound may be filled into the space between the glass substrate and the color filter forming a layer of liquid crystal material.

As further disclosed in Wu et al., a hardening protective layer may be placed on the top polarizer, to protect the top polarizer from scratching during the assembly process. To reduce glare and improve the contrast of the display, one or more anti-glaring treatments, such as an anti-reflective film, may be included in the panel. As disclosed in Wu et al., it may be advantageous to apply the anti-glaring treatment to the lower polarizer, so as to reduce undesirable optical effects, such as browning, glittering, and decreased contrast ratio.

As explained in Sawasaki et al., U.S. Pat. No. 7,557,895, which is assigned to AU Optronics Corp., the parent company of the assignee of the current application, and hereby incorporated by reference in its entirety, the thickness of the liquid crystal layer typically must be uniformly controlled, in order to avoid unevenness in brightness across the LCD panel. As disclosed in Sawasaki et al., the required uniformity may be achieved by disposing a plurality of pillar spacers between the TFT substrate and the color filter substrate. As further disclosed in Sawasaki et al., the pillar spacers may be formed with different heights, such that some spacers have a height that is greater than the gap between the substrates and other spacers have a height that is less than the gap between the substrates. This configuration may permit the spacing between the substrates to vary with temperature changes but also prevent excessive deformation when forces are applied to the panel.

Sawasaki et al. further discloses a method for assembling the substrates with the liquid crystal material between them. This method comprises steps of preparing the two substrates, coating a sealing material on the circumference of the outer periphery of one of the pair of substrates, dropping an appropriate volume of liquid crystal on one of the pair of substrates, and filling in the liquid crystal between the pair of substrates by attaching the pair of substrates in a vacuum followed by returning the attached pair of substrates to atmospheric pressure.

The TFTs, gate and data lines, and pixel electrodes may be formed in a multilayer structure such as that shown in FIGS. 1 and 2E of Lai et al., U.S. Pat. No. 7,170,092 and in its division U.S. Pat. No. 7,507,612, both of which are assigned to AU Optronics Corp., the parent company of the assignee of the current application, and both of which are hereby incorporated by reference in their entireties. The multilayer structure may comprise a first conducting layer, a first insulating layer, a semiconductor layer, a doped semiconductor layer, and a second conducting layer disposed in sequence on the substrate. It may further comprise a second insulating layer and a pixel electrode disposed on the second insulating layer. The first conducting layer may comprise at least one of a gate line or a gate electrode. The doped semiconductor layer may comprise a source and a drain. The second conducting layer may comprise a source electrode and a drain electrode. The multilayer structure may be formed using a series of wet and dry etching processes, for example as disclosed in Lai et al. FIGS. 2A-2D.

Additional techniques for forming TFTs are disclosed in Chen, U.S. Pat. No. 7,652,285, which is assigned to AU Optronics Corp., the parent company of the assignee of the current application, and hereby incorporated by reference in its entirety. As disclosed in Chen, to form the channel of the TFT, the second metal layer is etched in order to open a portion of the second metal layer over the gate electrode and to separate the source region and drain region. This etching can be performed in multiple ways, including the back-channel etching process disclosed for example in Chen FIGS. 2A-2E and the etch stop process disclosed for example in Chen FIGS. 5A-5D and 6.

Chen discloses that TFT leakage currents may be reduced by adding a spacer layer formed at the sidewalls of the conductive amorphous silicon layer, isolating the conductive amorphous silicon layer from the insulating layer. Chen discloses that this spacer layer can be formed by oxidizing the exposed surface of the conductive amorphous silicon layer after the etch of the second metal layer is performed. Chen discloses that this surface may be oxidized by a number of different techniques, including oxygen plasma ashing, or the use of ozone plasma in the presence of carbon tetrafluoride and sulfur hexafluoride gases.

As disclosed in Tsujimura et al., U.S. Pat. No. 6,689,629, which is assigned to AU Optronics Corp., the parent company of the assignee of the current application, and hereby incorporated by reference in its entirety, the wirings, such as the scan lines and signal lines of the array, are preferably comprised of a low-resistance material, such as aluminum or an aluminum alloy, so as to increase the speed with which the scan lines and signal lines operate. However, aluminum tends to be easily oxidized. For that reason, Tsujimura et al. discloses forming wirings as a two-layer structure, with a lower layer of aluminum, aluminum alloy or other low-resistance material, and an upper layer of molybdenum, chromium, tantalum, titanium, alloys thereof, or oxidation-resistant conductive material.

Tsujimura further discloses that the scan lines and signal lines contact connection pads, through which the array is connected to a driving system. Tsujimura discloses forming dummy conductive patterns, situated between the connection pads and the pixel electrodes, but not in contact with any of the wirings on the substrate. By increasing the density of conductive material in a given area, the dummy conductive patterns can reduce etching undercut and improve the tapered shape of the wiring.

An LCD backlight structure may include optical films. As disclosed in Fu et al., U.S. Pat. No. 7,125,157, which is assigned to AU Optronics Corp., the parent company of the assignee of the current application, and hereby incorporated by reference in its entirety, the optical films fixed to the backlight unit may expand or contract as temperature varies. In addition, some LCDs are rotatable between different angles. As the LCD is rotated, the weight of the optical films may be concentrated at single fixing points, resulting in stress and deformation of the optical films. Fu et al. discloses a supporting mechanism for the optical films that addresses these issues. The backlight frame comprises a plurality of supporting portions which may, for example, be formed as protrusions, cylinders, or cuboids. The film comprises a plurality of constraining portions which may, for example, be holes or grooves and may be circular, elliptical, rectangular, rectangular with rounded corners, or polygonal in shape. One or more of the supporting portions make contact with constraining portions and thereby support the optical films. As the position of the LCD is changed, for example by rotation, different supporting portions will be in contact with constraining portions and providing the required support.

In LCD panels, the semiconductor material making up the TFT channel may be amorphous silicon. However, as disclosed in Chen, U.S. Pat. No. 6,818,967, which is assigned to AU Optronics Corp., the parent company of the assignee of the current application, and hereby incorporated by reference in its entirety, poly-silicon channel TFTs offer advantages over amorphous silicon TFTs, including lower power and greater electron migration rates. As disclosed in Chen, the re-crystallization process of LTPS results in the formation of mounds on the surface of the poly-silicon layer, and these mounds impact the current characteristics of the LTPS TFT. Chen discloses a method to reduce the size of the LTPS surface mounds, by performing a first anneal treatment, then performing a surface etching treatment, for example using a solution of hydrofluoric acid, and then performing a second anneal treatment. The resulting LTPS surface has mounds with a height/width ratio of less than 0.2. A gate isolation layer, gate, dielectric layer, and source and drain metal layers can then be deposited above the LTPS layer to form a complete LTPS TFT.

For the current TFT-LCD, except for a ring of sealant around the boarder of the liquid crystal cell, the top and bottom substrates are separated. When the cell is bended for a curved display, the top and bottom substrates will shift laterally for a different amount, causing a lot of problems such as light leakage, mura, yellowish, poor transmittance, color mixing and so on.

Therefore, a heretofore unaddressed need exists in the art to address the aforementioned deficiencies and inadequacies.

SUMMARY OF THE DISCLOSURE

One aspect of the disclosure relates to a pixel structure having a light transmitting region and a light shielding region. In one embodiment, the pixel structure includes a first substrate having a counter electrode, a second substrate having a plurality of signal lines, a pixel electrode, a thin-film transistor (TFT) and a bottom black matrix, a liquid crystal layer having liquid crystal molecules and formed between the first substrate and the second substrate, and a holding member formed in the light shielding region and attached to the first substrate and the second substrate. In one embodiment, the second substrate further comprises a color filter layer.

In one embodiment, the light shielding region is defined by the bottom black matrix or by the signal lines and the bottom black matrix.

In one embodiment, the first substrate further comprises a top black matrix. In one embodiment, the light shielding region is defined by the bottom black matrix and the top black matrix or by the signal lines, the bottom black matrix and the top black matrix.

In one embodiment, the ratio of a projection area of the holding member to a projection area of the light shielding region is greater than 20%.

In one embodiment, the holding member comprises a wall-like structure, a column-like structure, or a combination thereof. In one embodiment, the holding member is elastic or rigid.

In one embodiment, the holding member comprises a polymer formed by exposing first monomers mixed with the liquid crystal molecules in the light shielding region to a first ultraviolet (UV) light.

In one embodiment, the pixel structure further includes an alignment layer. In one embodiment, the liquid crystal molecules are aligned by exposing second monomers mixed with the liquid crystal molecules or the alignment layer to a second UV light.

In one embodiment, the first UV light has a wavelength different from that of the second UV light. In one embodiment, one of the first UV light and the second UV light has the wavelength in a range of 320-400 nm, and the other of the first UV light and the second UV light has the wavelength in a range of 290-320 nm.

Another aspect of the disclosure relates to a liquid crystal display comprising a plurality of pixel structures. Each pixel structure is defined as above.

Yet another aspect of the disclosure relates to a method for fabricating a liquid crystal display. In one embodiment, the method includes providing a first substrate and a second substrate defining a space therebetween, where the first substrate and the second substrate are configured to have a light transmitting region and a light shielding region, filling a mixture of liquid crystal molecules, first monomers and second monomers in the space between the first substrate and the second substrate, exposing the space to a first UV light causing the first monomers to be polymerized to form a holding member in the light shielding region to attach the first substrate and the second substrate, and exposing the space to a second UV light causing the second monomers to align the liquid crystal molecules.

In one embodiment, the first UV light has a wavelength different from that of the second UV light. In one embodiment, one of the first UV light and the second UV light has the wavelength in a range of 320-400 nm, and the other of the first UV light and the second UV light has the wavelength in a range of 290-320 nm.

In one embodiment, the first substrate has a counter electrode and the second substrate has a pixel electrode. The method further comprises applying an electric field between the counter electrode and the pixel electrode while exposing the space to the second UV light causing the second monomers to align the liquid crystal molecules.

In one embodiment, the step of exposing the space to the first UV light causing the first monomers to be polymerized to form the holding member in the light shielding region to attach the first substrate and the second substrate is performed with a mask.

In one embodiment, the first substrate has a counter electrode and the second substrate has a pixel electrode. The method further comprises applying an electric field between the counter electrode and the pixel electrode to move the first monomers and the liquid crystal molecules before exposing the space to the first UV light causing the first monomers to be polymerized to form the holding member in the light shielding region to attach the first substrate and the second substrate.

A further aspect of the disclosure relates to a method for fabricating a liquid crystal display. In one embodiment, the method includes providing a first substrate and a second substrate each equipped with an alignment layer defining a space therebetween, where the first substrate and the second substrate are configured to have a light transmitting region and a light shielding region and the alignment layer is mixed with second monomers, filling a mixture of liquid crystal molecules and first monomers in the space between the first substrate and the second substrate, exposing the space to a first UV light causing the first monomers to be polymerized to form a holding member in the light shielding region to attach the first substrate and the second substrate, and exposing the space to a second UV light causing the second monomers to align the liquid crystal molecules.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION OF THE DISCLOSURE

Figure 1:
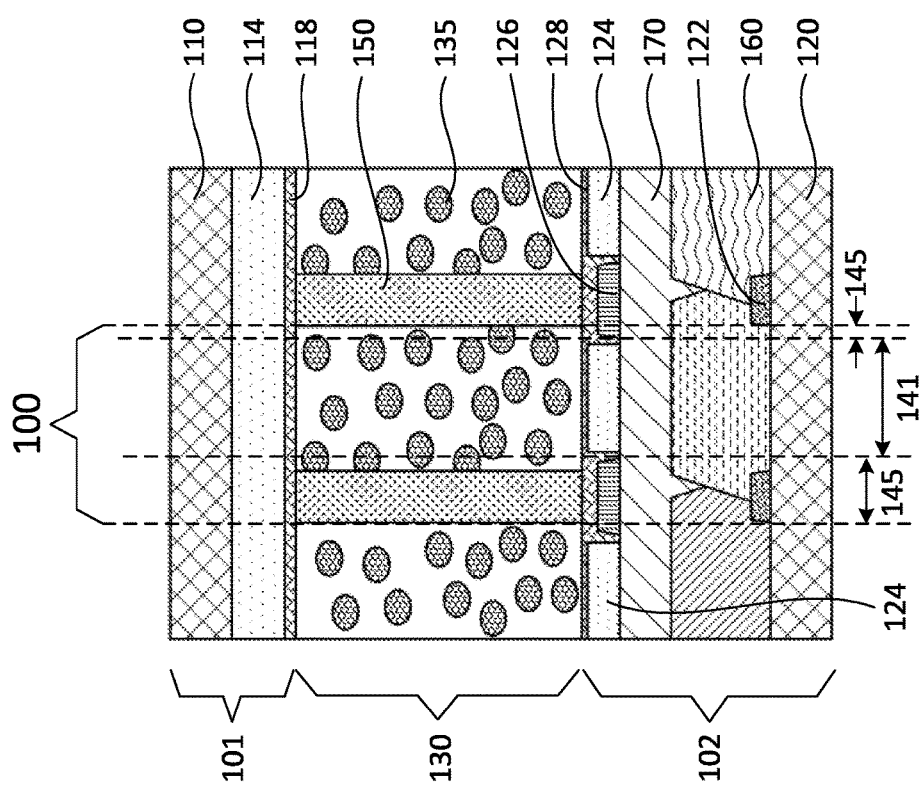
FIG. 1 shows schematically a cross-sectional view of a pixel structure having a holding member according to one embodiment of the disclosure. The cross-sectional view is along the line 1-1 shown in FIG. 2.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of "above" and "below".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The description will be made as to the embodiments of the present disclosure in conjunction with the accompanying drawings. In accordance with the purposes of this disclosure, as embodied and broadly described herein, this disclosure, in one aspect, relates to an LCD that utilizes a holding member to bind the top and bottom substrates together so as to prevent the top and bottom substrates from shift during bending.

Figure 23:
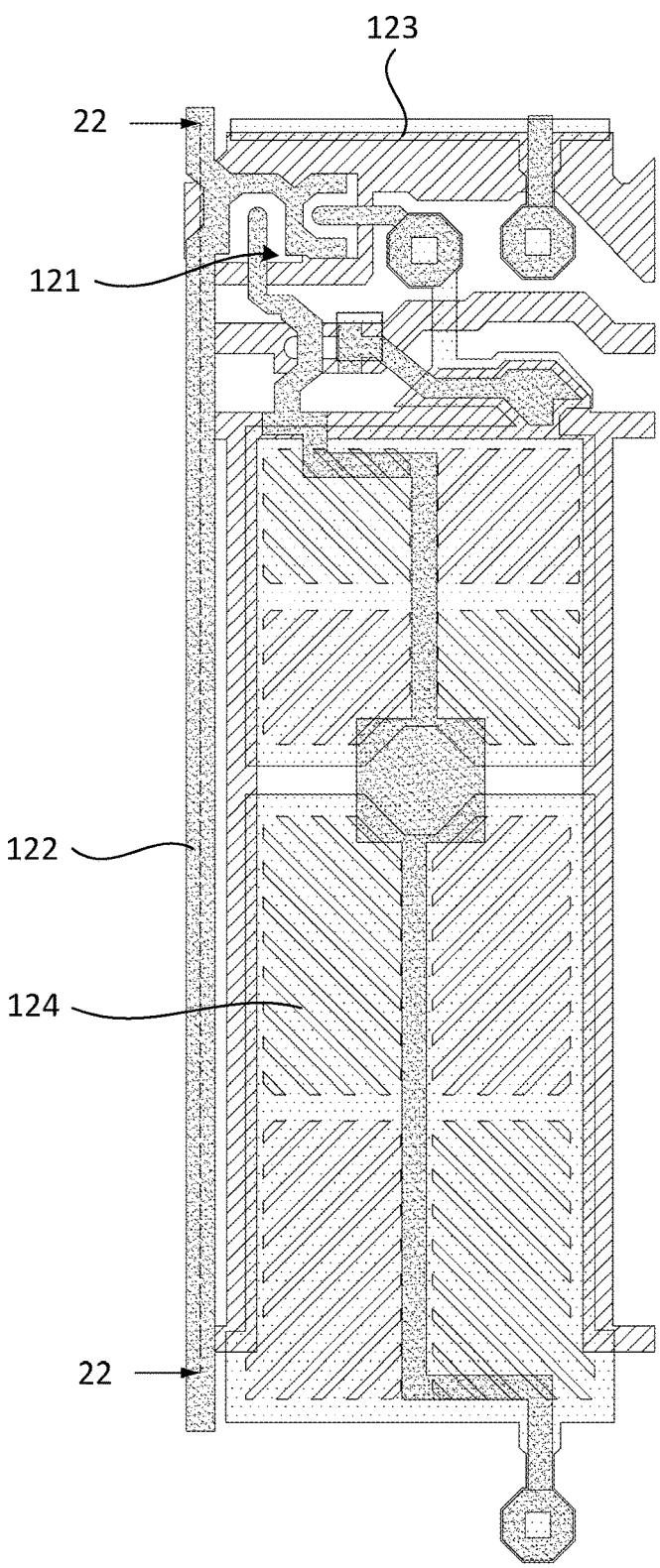
FIG. 23 shows schematically a top view of a bottom substrate of a pixel structure according to one embodiment of the disclosure.

Referring to FIGS. 1 and 23, and particularly FIG. 1, a pixel structure 100 usable for an LCD is shown schematically according to one embodiment of the disclosure. The pixel structure 100 has a light transmitting region 141 and a light shielding region 145. The pixel structure 100 includes a first substrate 101, a second substrate 102 and a liquid crystal layer 130. The first substrate 101 has a top plate 110 and a counter electrode 114 formed on the top plate 110. The second substrate 102 has a bottom plate 120, a TFT 121, a data signal line 122, a gate signal line 123, a pixel electrode 124, and a bottom black matrix 126 formed on the bottom plate 120. The liquid crystal layer 130 having liquid crystal molecules 135 is disposed in a space defined between the first substrate 101 and the second substrate 102. In addition, the pixel structure 100 also includes a holding member 150 formed in the light shielding region 145 and attached to the first substrate 101 and the second substrate 102. Specifically, in the exemplary embodiment shown in FIG. 1, the holding member 150 is formed above the bottom black matrix 126. The material of the holding member 150 comprises a polymer.

In certain embodiments, the pixel structure 100 also includes alignment layers 118 and 128 formed on the counter electrode 114 and the pixel electrode 124, respectively. Further, the pixel structure 100 may also have a color filter layer 160 formed on the bottom plate 120 and an insulation layer 170 formed between the color filter layer 160 and the pixel electrode 124.

In certain embodiments, the bottom black matrix 126 is a pattern of black lines on the color filter 160 that shields signal lines and TFTs from the viewable area of a display, and which distinguish different color pixels to prevent color mixing and light leakage, thereby improving contrast. In certain embodiments, the bottom black matrix 126 is formed of the same material as the black photo spacers.

In certain embodiments, the top plate 110 and the bottom plate 120 are glass plates, and the counter electrode 114 comprises a common electrode formed of a transparently conductive material, such as indium tin oxide (ITO) or the like. In certain embodiments, the pixel electrode 124 is formed of a transparently conductive material, such as ITO or the like.

Figure 2:
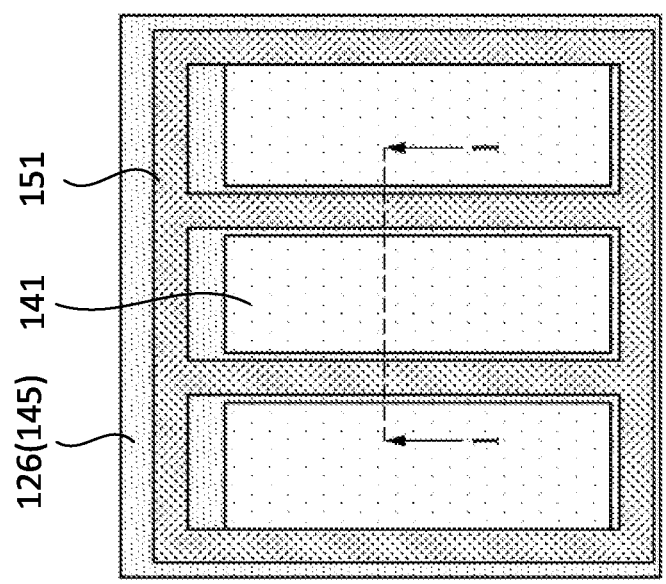
FIG. 2 shows schematically a top view of pixel structures having a holding member according to one embodiment of the present disclosure.

Referring to FIGS. 1 and 2, the bottom black matrix 126 is above the data signal line 122 and the gate signal line (not shown) and the projection area of the bottom black matrix 126 is larger than and overlaps the projection area of the signal lines. The light shielding region 145 is defined by the bottom black matrix 126.

Figure 3:
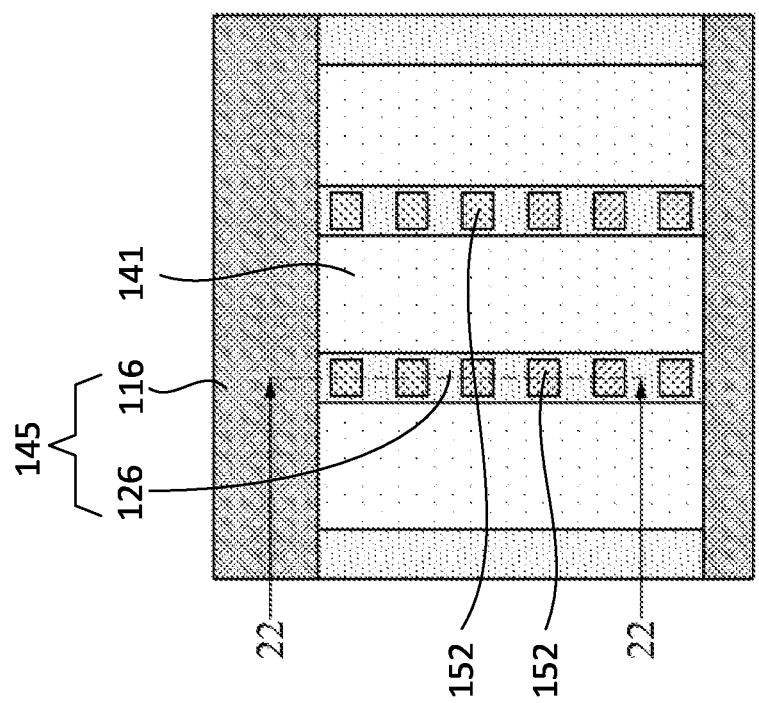
FIG. 3 shows schematically a top view of pixel structures having a holding member according to another embodiment of the present disclosure.
Figure 22:
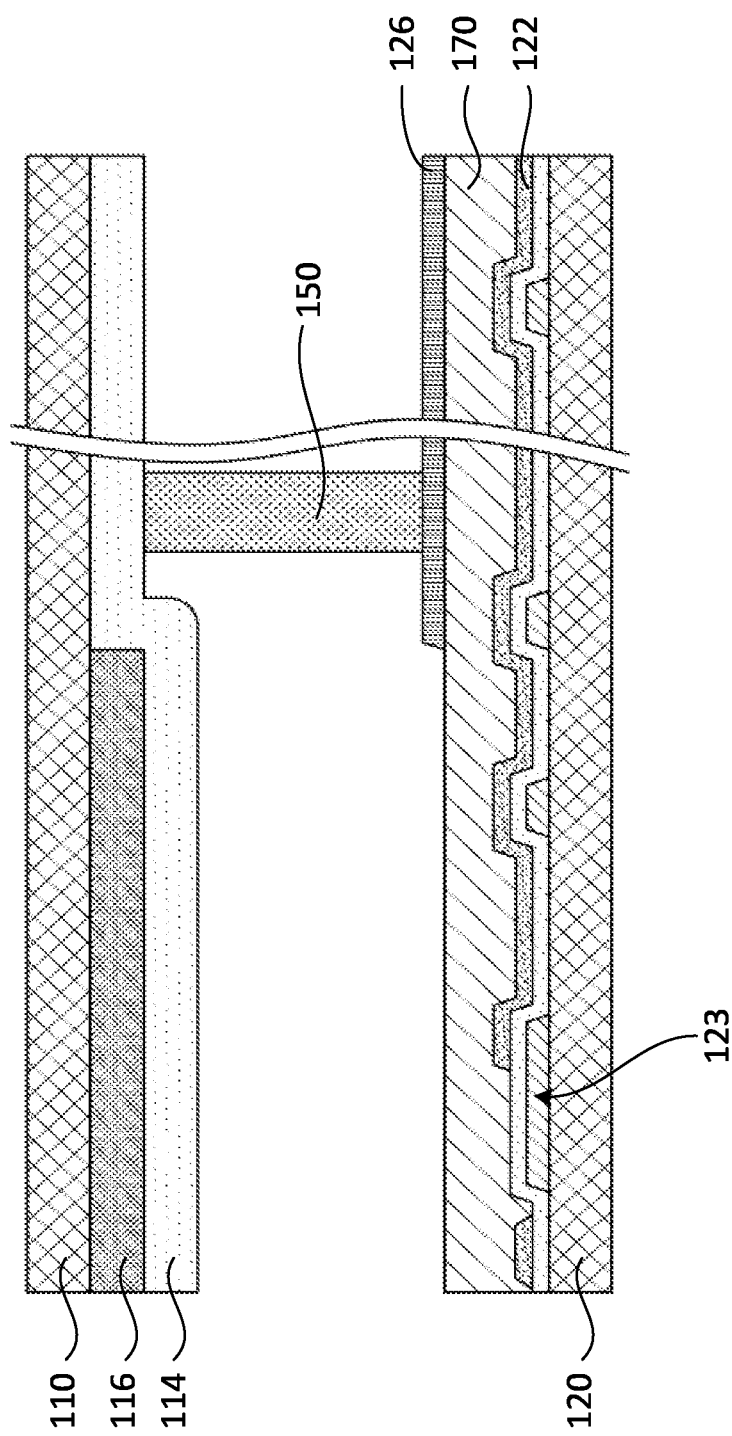
FIG. 22 shows schematically a cross-sectional view of a pixel structure having a holding member according to one embodiment of the disclosure. The cross-sectional view is along the lines 22-22 shown in FIGS. 3 and 23.

In one embodiment, the top plate 110 further comprises a top black matrix 116, as shown in FIGS. 3 and 22. The bottom black matrix 126 and the top black matrix 116 is above the data signal line 122 and the gate signal line 123, and the projection area of the bottom black matrix 126 along with the top black matrix 116 is larger than and overlaps the projection area of the signal lines. The light shielding region 145 is defined by the bottom black matrix 126 and the top black matrix 116.

The holding member 150 can be elastic or rigid, preferably rigid. As such, the holding member 150 can create a force binding the first substrate 101 and the second substrate 102 together, which prevents the first substrate 101 and the second substrate 102 from shift during bending of the cell, thereby reducing light leakage and improving display characteristics by effectively preventing bending-induced display defects such as mura, yellowish, poor transmittance, color mixing, and so on.

In certain embodiments, the holding member 150 comprises a wall-like structure 151, a column-like structure 152, or a combination thereof.

FIGS. 2-6 show schematically the pixel structures having a holding member 150 formed in different structures according to embodiments of the present disclosure. Each pixel structure has the light transmitting region 141 and the light shielding region 145 at least partially surrounding the light transmitting region 141.

In one embodiment, as shown in FIG. 2, the light shielding region 145 is defined by the bottom black matrix 126 formed on the bottom plate 120. The pixel structure has the wall-like structure 151 of the holding member 150 formed in the light shielding region 145 and surrounding the light transmitting region 141. In this embodiment, the ratio of a projection area of the holding member (wall-like structure) 150 to a projection area of the light shielding region 145 is high, likely 90% or greater than 90%.

In another embodiment, as shown in FIG. 3, the light shielding region 145 is defined by the bottom black matrix 126 formed on the bottom plate 120 and the top black matrix 116 formed on the top plate 110. The holding member 150 is formed of the column-like structure 152 above the bottom black matrix 126.

Figure 4:
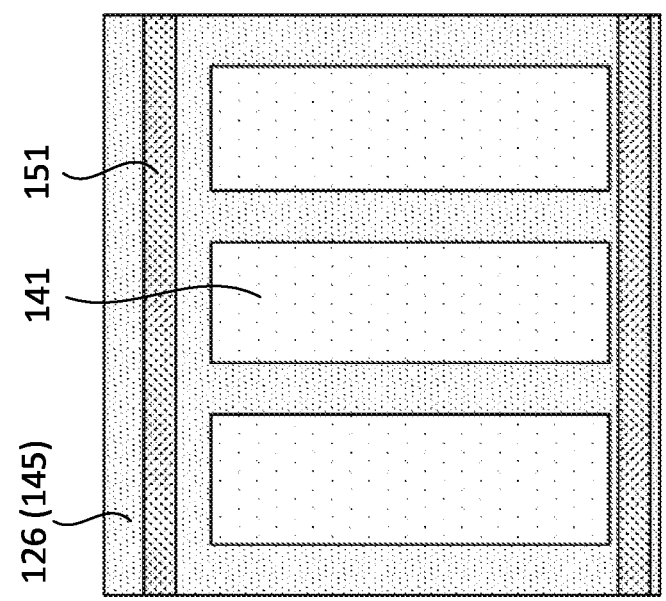
FIG. 4 shows schematically a top view of pixel structures having a holding member according to yet another embodiment of the present disclosure.

Similar to the embodiment as shown in FIG. 2, FIG. 4 shows an embodiment, where the holding member 150 is formed of the wall-like structure 151 in the light shielding region 145 and do not surround the light transmitting region 141. The light shielding region 145 is also defined by the bottom black matrix 126 formed on the bottom plate 120.

Figure 5:
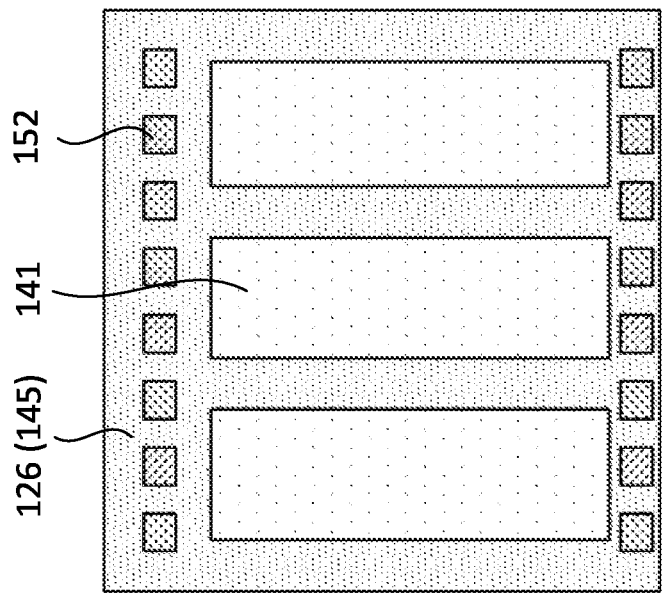
FIG. 5 shows schematically a top view of pixel structures having a holding member according to still another embodiment of the present disclosure.

In a different embodiment, as shown in FIG. 5, the holding member 150 is formed of the column-like structure 152 in the light shielding region 145 defined by the bottom black matrix 126 formed on the bottom plate 120.

Figure 6:
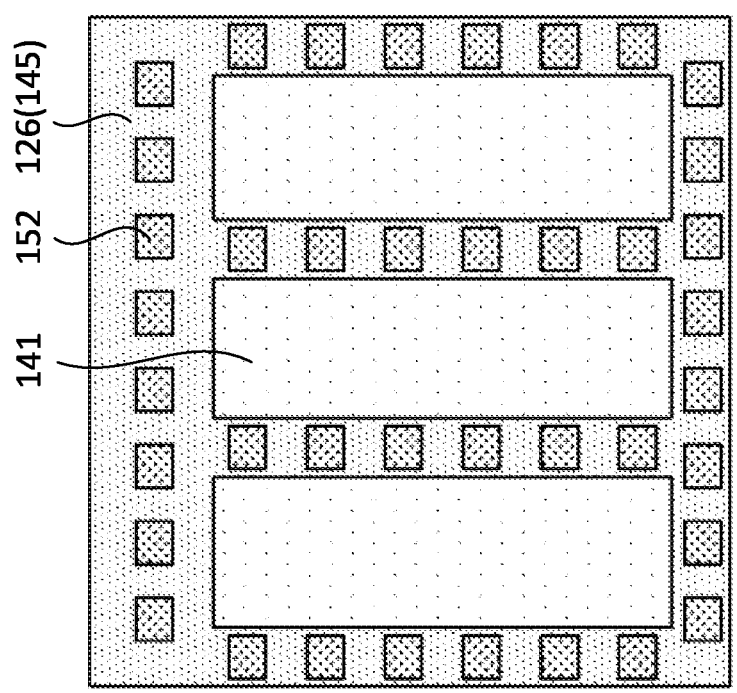
FIG. 6 shows schematically a top view of pixel structures having a holding member according to a further embodiment of the present disclosure.

Similar to the embodiment as shown in FIG. 5, the holding member 150 is formed of the column-like structure 152 in the light shielding region 145 defined by the bottom black matrix 126 formed on the bottom plate 120 and surrounds the light transmitting region 141, as shown in FIG. 6.

In these exemplary embodiments shown in FIGS. 3-6, the ratio of the projection area of the holding member 150 to the projection area of the light shielding regions 145 is equal to, or greater than 20%. Preferably, the ratio of the projection area of the holding member 150 to the projection area of the light shielding regions 145 is equal to, or greater than 50%. More preferably, the ratio of the projection area of the holding member 150 to the projection area of the light shielding regions 145 is equal to, or greater than 90%.

Figure 7:
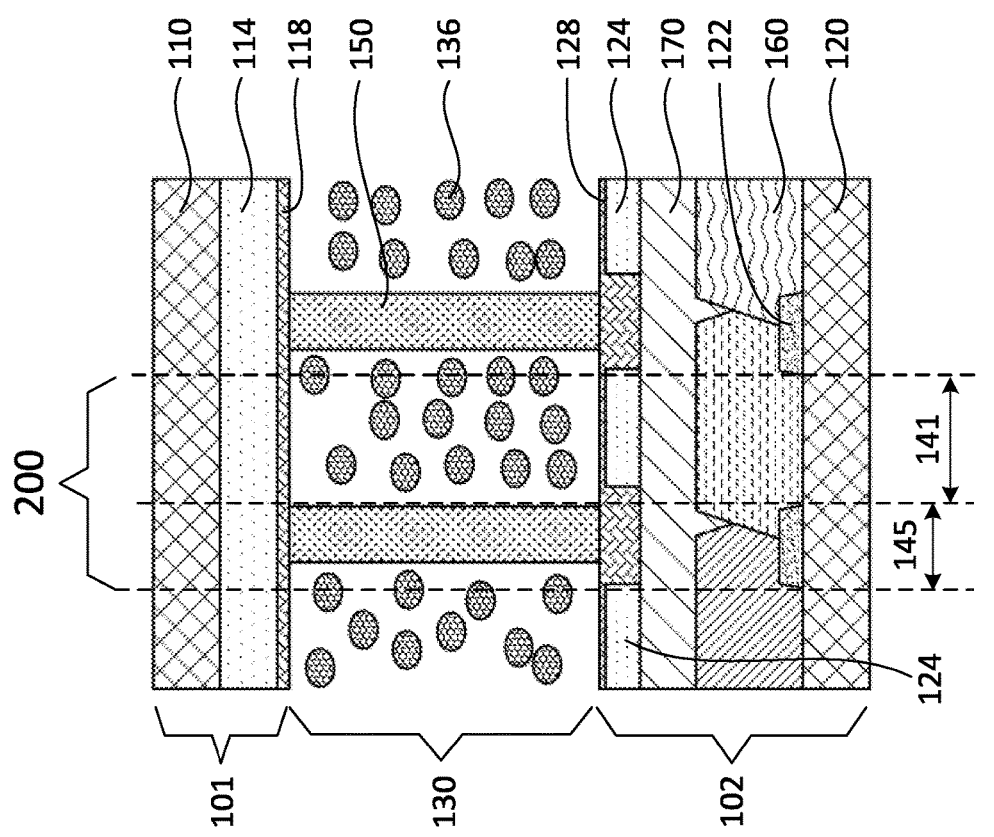
FIG. 7 shows schematically a cross-sectional view of a pixel structure having a holding member according to one embodiment of the disclosure. The cross-sectional view is along the line 7-7 shown in FIG. 10.

FIG. 7 shows schematically a pixel structure 200 usable for an LCD according to another embodiment of the disclosure. The pixel structure 200 is structurally similar to the pixel structure 100 shown in FIG. 1, except that there is no bottom black matrix 126 over the data signal line 122.

Figure 10:
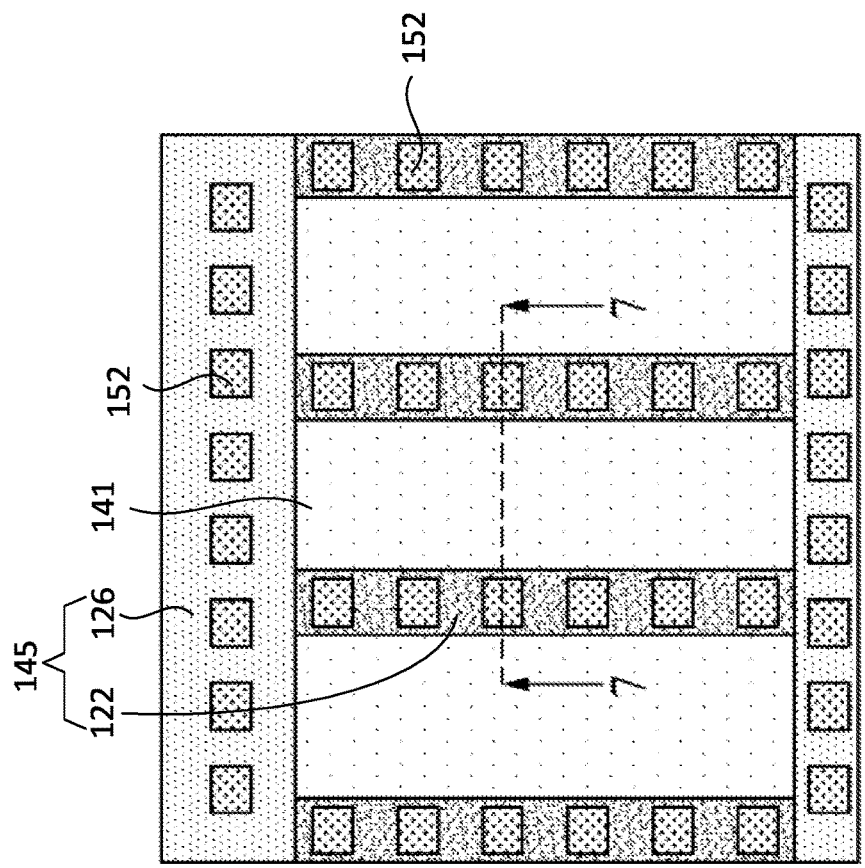
FIG. 10 shows schematically a top view of pixel structures having a holding member according to another embodiment of the present disclosure.

Further referring to FIGS. 7 and 10, the holding member 150 is formed of the column-like structure 152 above the bottom black matrix 126 and the data signal line 122. The light shielding region 145 is defined by the bottom black matrix 126 and the data signal line 122.

Figure 8:
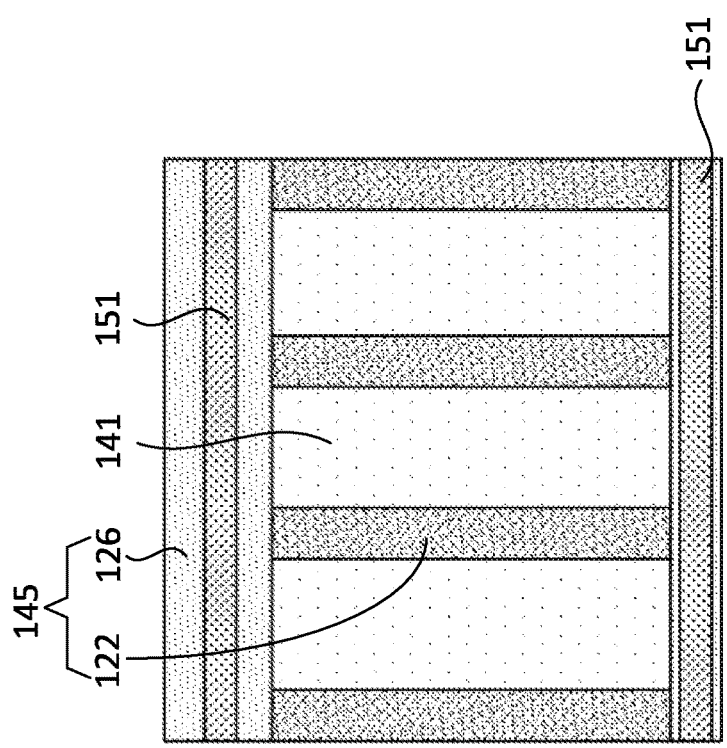
FIG. 8 shows schematically a top view of pixel structures having a holding member according to a different embodiment of the present disclosure.

Similar to the embodiment as shown in FIG. 10, the holding member 150 is formed of the wall-like structure 151 over the bottom matrix 126 and in the light shielding region 145 defined by the bottom black matrix 126 and the data signal line 122, as shown in FIG. 8.

Figure 9:
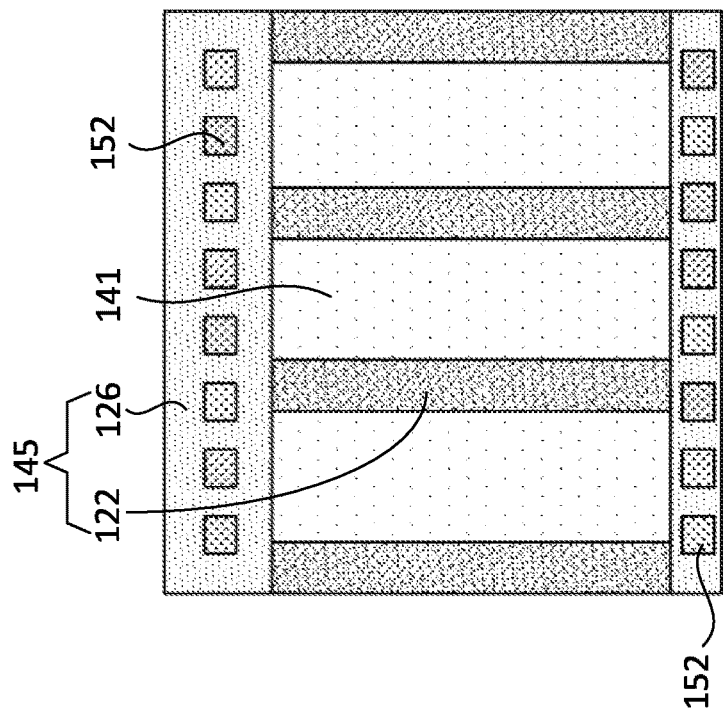
FIG. 9 shows schematically a top view of pixel structures having a holding member according to one embodiment of the present disclosure.

In a different embodiment, the holding member 150 is formed of the column-like structure 152 over the bottom matrix 126 and in the light shielding region 145 defined by the bottom black matrix 126 and the data signal line 122, as shown in FIG. 9.

The foregoing exemplary embodiments of the pixel structure having the holding member 150 are presented only for the purposes of illustration and description, it should be appreciated that one skilled in the art, in light of the present disclosure, could recognize that numerous modifications of the holding member 150 of the pixel structure can also be utilized to practice this invention without departing from the spirit and intended scope of the disclosure.

Figure 11:
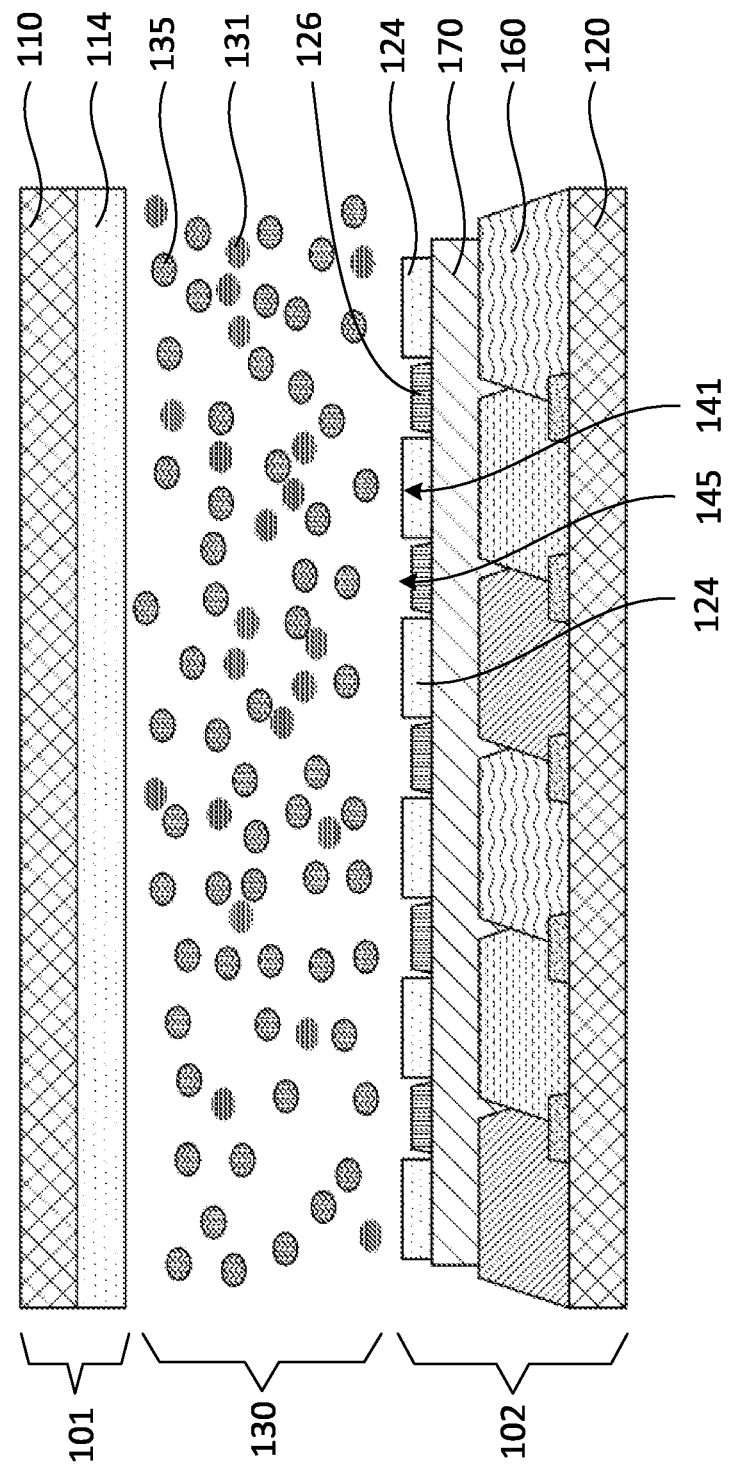
FIGS. 11 and 12 show schematically a process of fabricating an LCD including pixel structures having a holding member according to one embodiment of the present disclosure.
Figure 12:
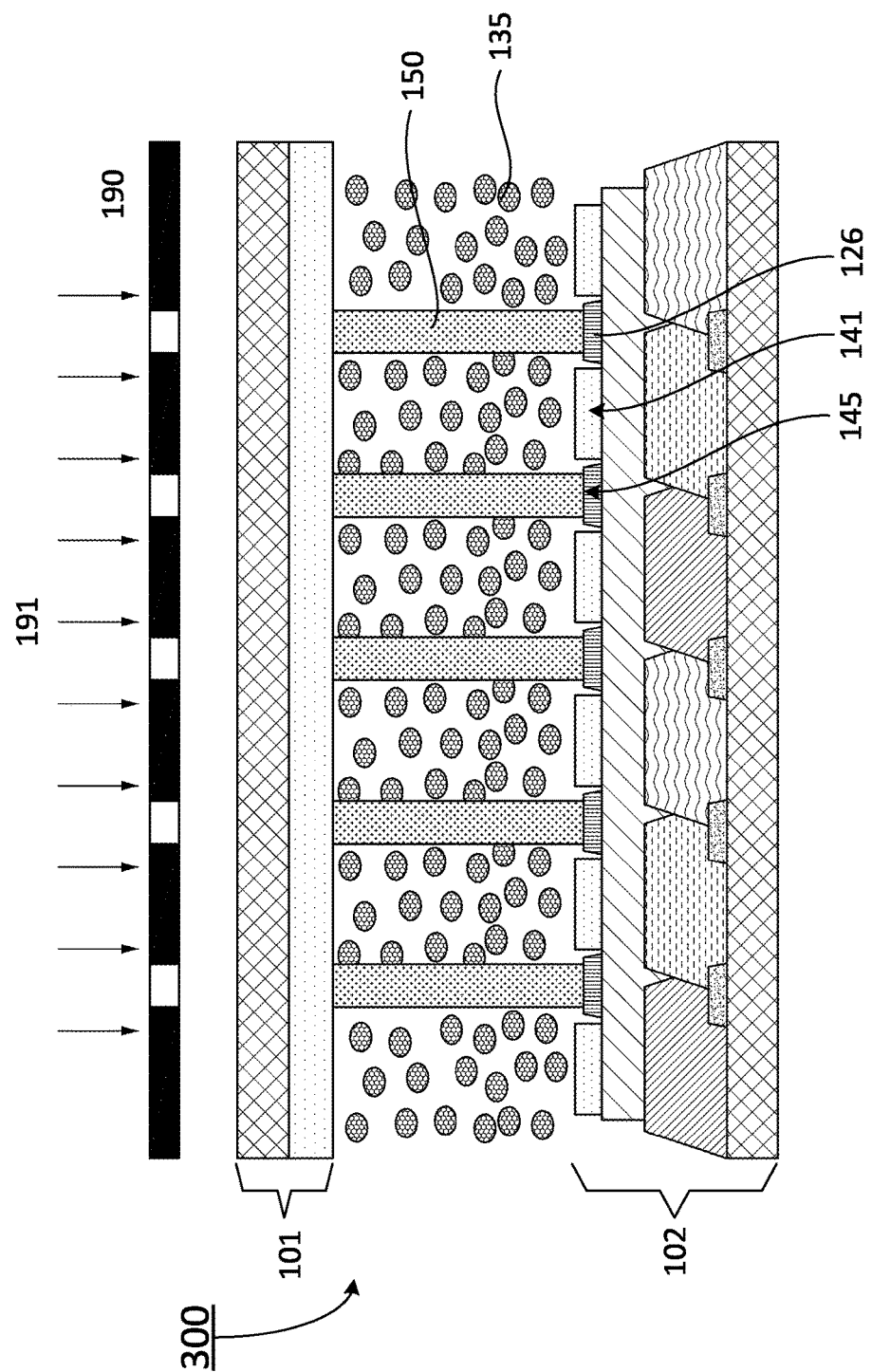

FIGS. 11 and 12 show schematically the LCD 300 and the process of fabricating the same according to one embodiment of the disclosure. The LCD 300 includes a plurality of pixel structures arranged in the form of a pixel matrix (or array). The holding members 150 are formed from the monomers 131 that are mixed with the liquid crystal molecules 135. The mixture of the monomers 131 and the liquid crystal molecules 135 is first filled in the space between the first substrate 101 and the second substrate 102, as shown in FIG. 11. Next, the space is closed. Then a mask 190 is positioned above the first substrate 101 and the space is exposed to a UV light 191 through the mask 190, thereby the monomers 131 are polymerized to form the holding members 150 in the light shielding regions 145, as shown in FIG. 12.

Figure 13:
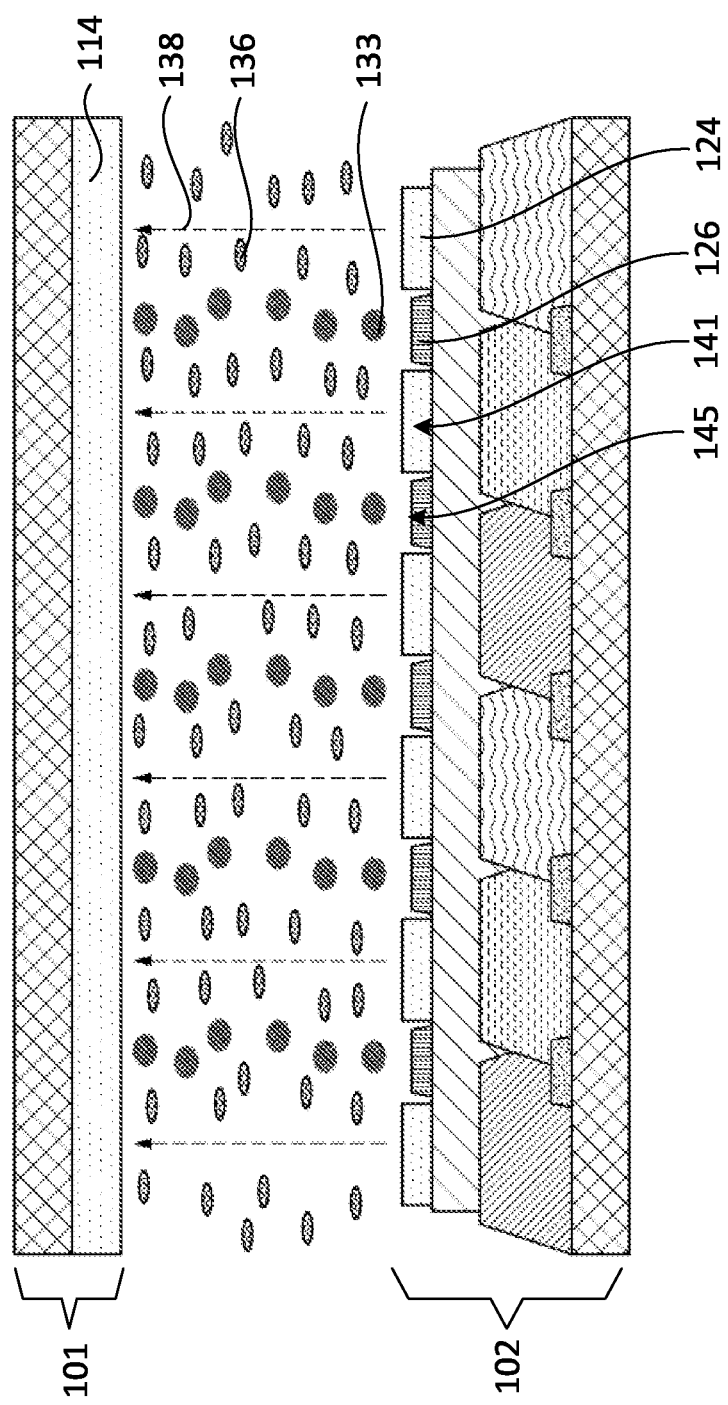
FIGS. 13 and 14 show schematically a process of fabricating an LCD including pixel structures having a holding member according to another embodiment of the present disclosure.
Figure 14:
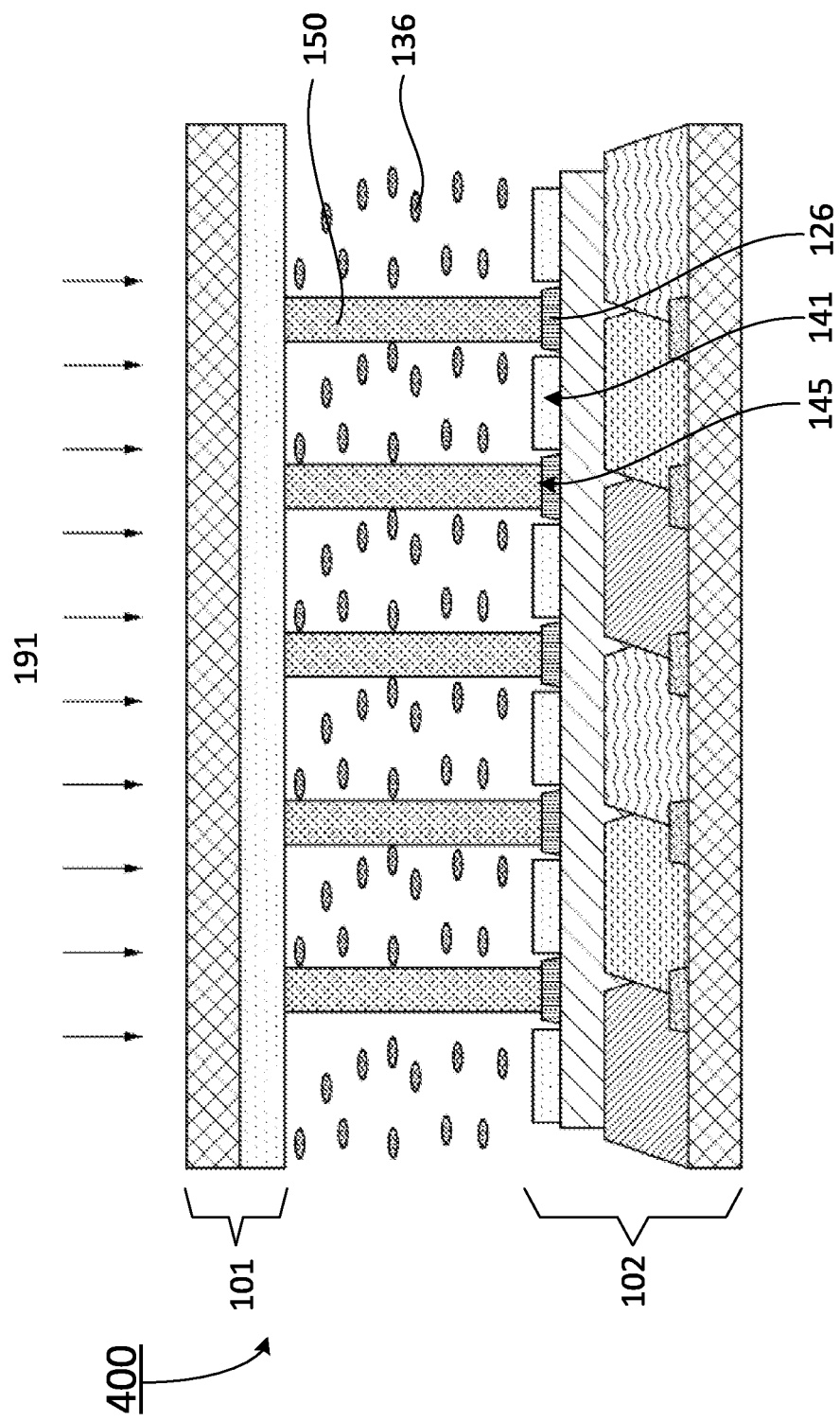

FIGS. 13 and 14 show schematically the LCD 400 and the process of fabricating the same according to another embodiment of the disclosure. The LCD 400 includes a plurality of pixel structures arranged in the form of a pixel matrix (or array). The holding members 150 are formed from the monomers 133 that are mixed with the liquid crystal molecules 136. The mixture of the monomers 133 and the liquid crystal molecules 136 is first filled in the space between the first substrate 101 and the second substrate 102. Next, the space is closed. Then an electric field 138 is applied between the counter electrode 114 and the pixel electrode 124 (e.g., the potential difference between the counter electrode 114 and the pixel electrode 124 is 10V) to move the monomers 133 to the low field region, i.e., the light shielding region 145, and the liquid crystal molecules 136 to the high field region, i.e., the light transmitting region 141, as shown in FIG. 13. Subsequently, the space is exposed to a UV light 191 from the first substrate 101, thereby the monomers 133 are polymerized to form the holding members 150 in the light shielding regions 145, as shown in FIG. 14.

Moreover, the embodiments of the LCDs 300 and 400 shown in FIGS. 11-14 also include alignment layers (not shown) formed on the counter electrode 114 and the pixel electrode 124, respectively.

Figure 18:
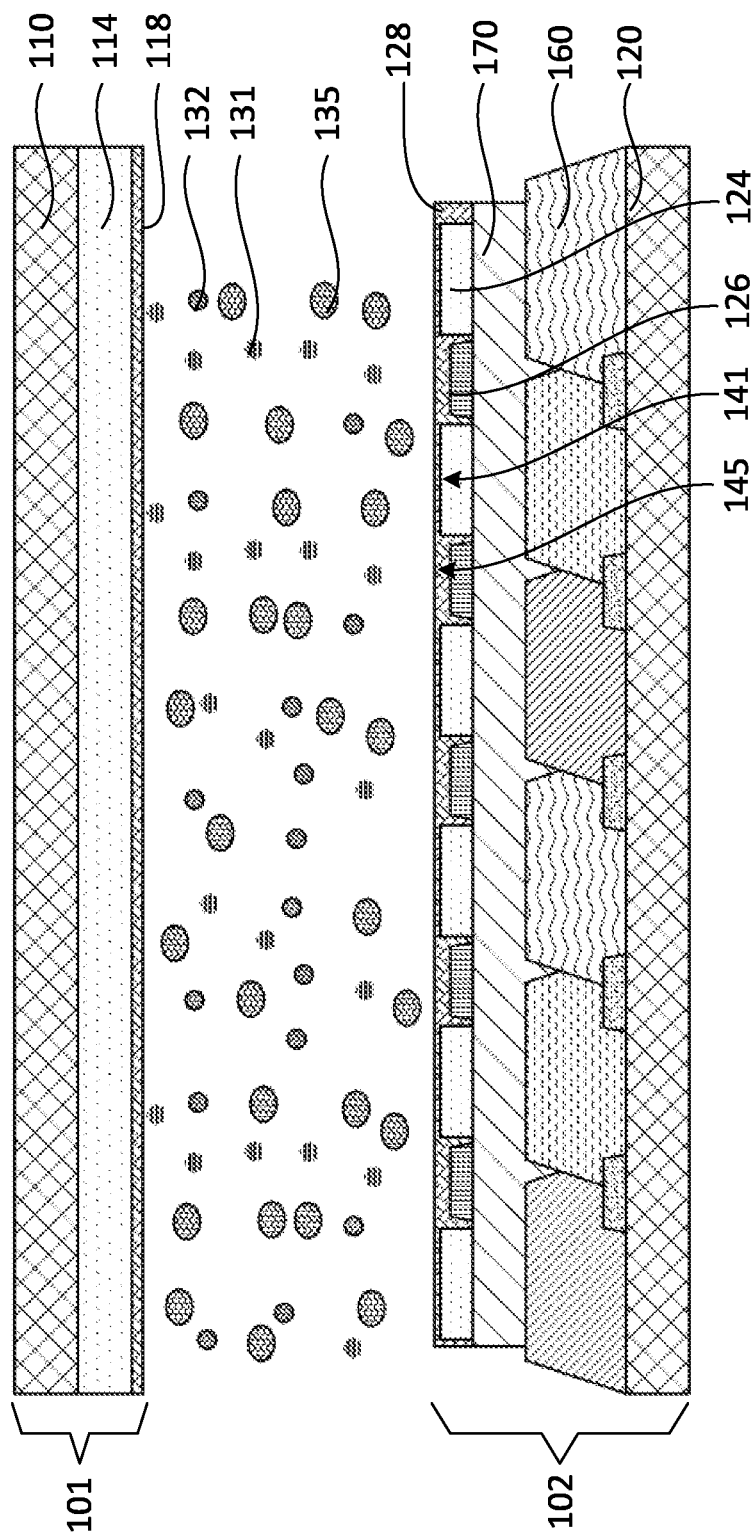
FIGS. 18-21 show schematically a process of fabricating an LCD including pixel structures having a holding member according to different embodiments of the present disclosure.
Figure 20:
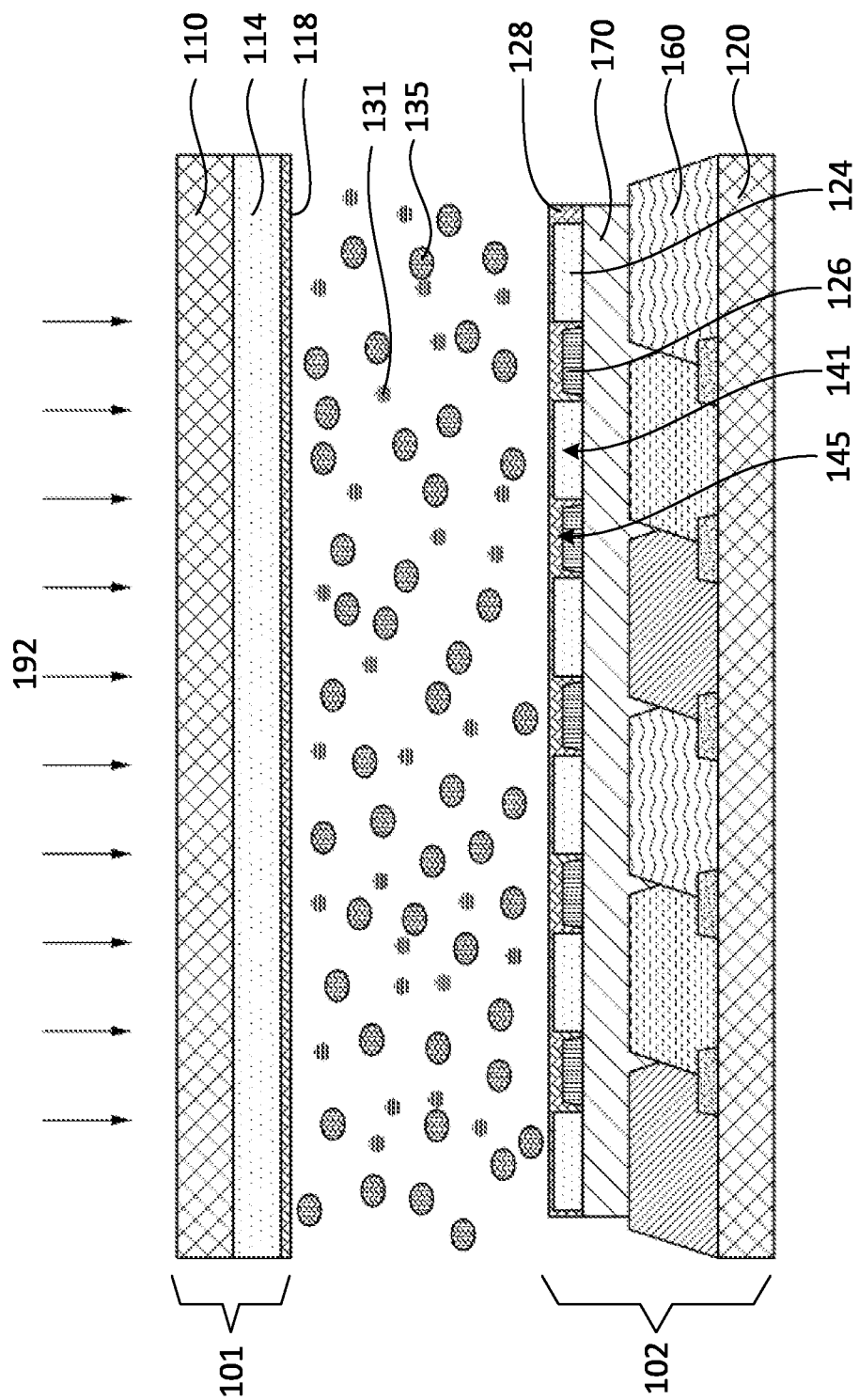
Figure 21:
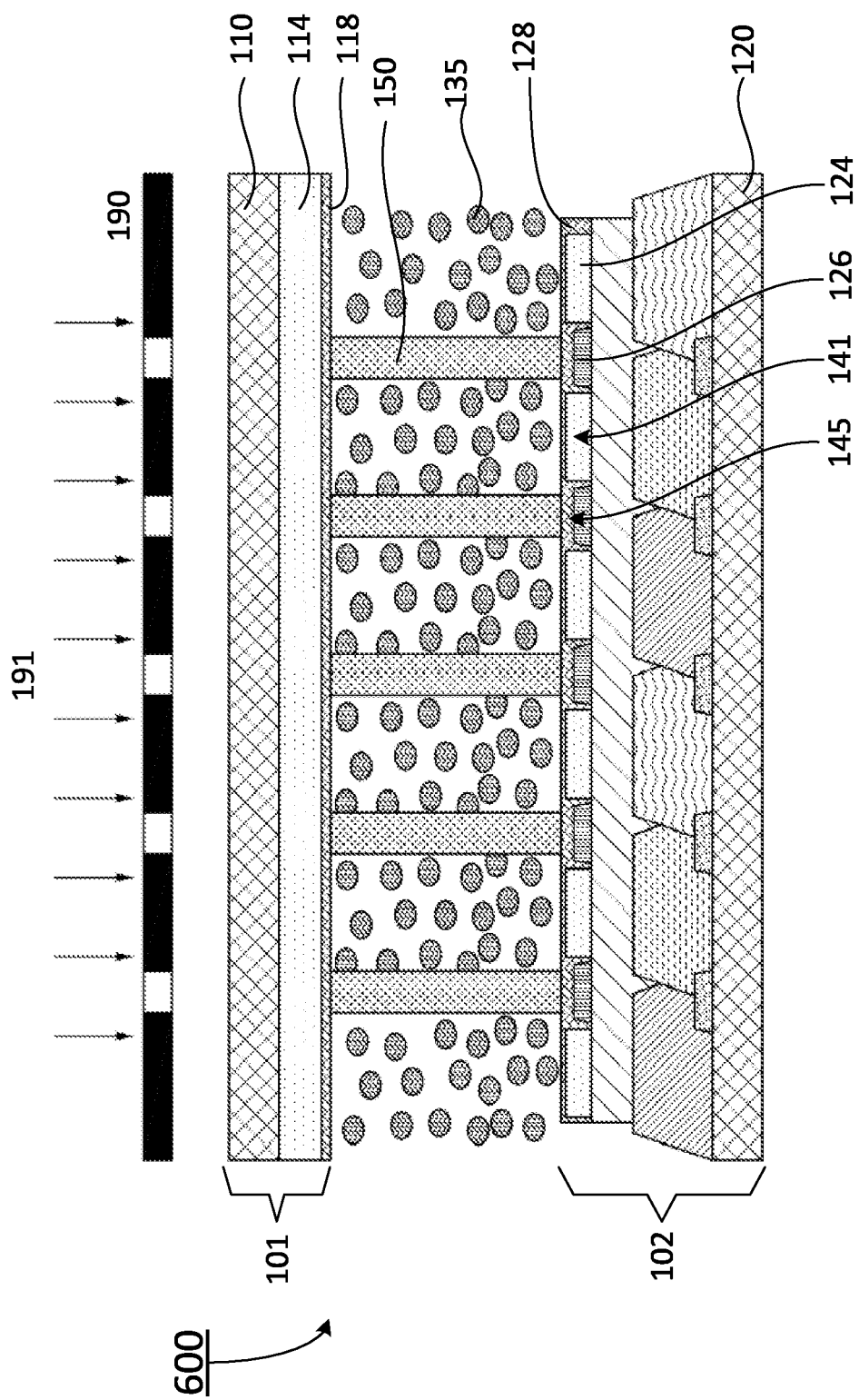

FIGS. 18, 20, and 21 show schematically the LCD 600 and the process of fabricating the same according to one embodiment of the disclosure. The LCD 600 includes a plurality of pixel structures arranged in the form of a pixel matrix (or array). In addition, the LCD 600 also includes, among other things, alignment layers 118 and 128 formed on the counter electrode 114 and the pixel electrode 124, respectively. In certain embodiments, the alignment layers 118 and 128 comprise polyimide (PI). In this embodiment of the fabricating process, a mixture of liquid crystal molecules 135, first monomers 131 and second monomers 132 is first filled in the space between the first substrate 101 and the second substrate 102, as shown in FIG. 18. The first monomers 131 and the second monomers 132 have different sensitivities to a wavelength of light, particularly UV light. For example, in this exemplary embodiment, the second monomers 132 are more sensitive to a light of longer wavelength than the first monomers 131. Next, the space is closed. Then an electric field (not shown) is applied between the counter electrode 114 and the pixel electrodes 124 while the space is exposed to a second UV light 192 mainly reacting the second monomers 132 to align the liquid crystal molecules 135, as shown in FIG. 20. Specifically, when the space is exposed to the second UV light 192, the second monomers 132 migrate to the surface of the alignment layers 118 and 128, are polymerized at the surface of the alignment layers 118 and 128 and help fix the liquid crystal molecules 135 in a pre-tilt angle. The second UV light 192 has a wavelength in a range of 320-400 nm, for example, 365 nm. Subsequently, a mask 190 is positioned above the first substrate 101 and the space is exposed to a first UV light 191 through the mask 190, thereby the first monomers 131 and remaining second monomers 132 are reacted to form the holding members 150 in the light shielding regions 145, as shown in FIG. 21. The first UV light 191 has a wavelength in a range of 290-320 nm, for example, 313 nm. The second monomers 132 may have a structure where no linkage group between a reaction site (e.g., acrylate, methacrylate) and a hard core (e.g., benzene) exists.

Figure 19:
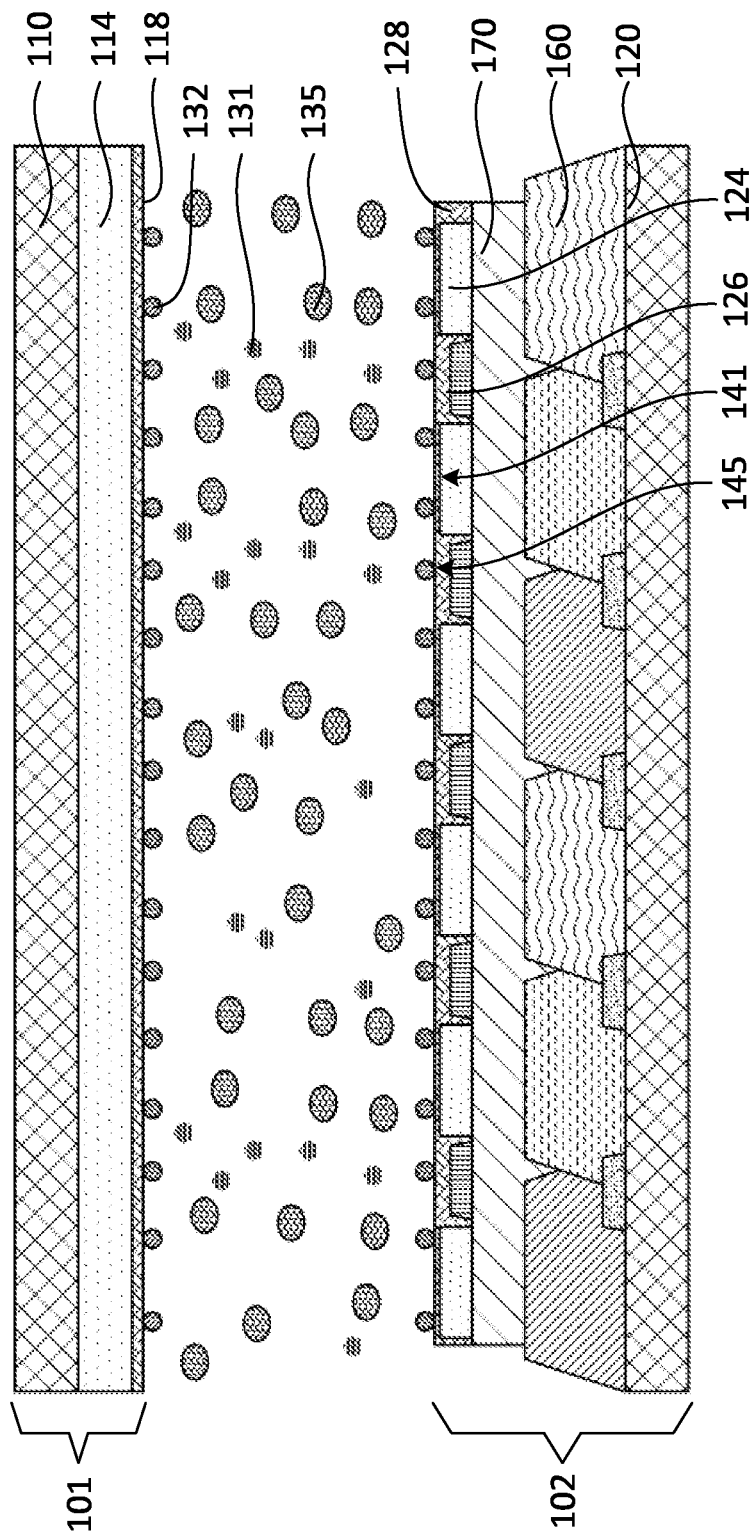

In another embodiment of the disclosure, the second monomers 132 are mixed in the alignment layers 118 and 128, and a mixture of liquid crystal molecules 135 and first monomers 131 is filled in the space between the first substrate 101 and the second substrate 102, as shown in FIG. 19. In this exemplary embodiment, the second monomers 132 are more sensitive to a light of longer wavelength than the first monomers 131. Next, the space is closed. Then an electric field (not shown) is applied between the counter electrode 114 and the pixel electrodes 124 while the space is exposed to a second UV light 192 causing the second monomers 132 to align the liquid crystal molecules 135, as shown in FIG. 20. Specifically, when the space is exposed to the second UV light 192, the second monomers 132 are linked in the alignment layers 118 and 128 and help fix the liquid crystal molecules 135 in a pre-tilt angle. The second UV light 192 has a wavelength in a range of 320-400 nm, for example, 365 nm. Subsequently, a mask 190 is positioned above the first substrate 101 and the space is exposed to a first UV light 191 through the mask 190, thereby the first monomers 131 and remaining second monomers 132 are reacted to form the holding members 150 in the light shielding regions 145, as shown in FIG. 21. The first UV light 191 has a wavelength in a range of 290-320 nm, for example, 313 nm.

In a different embodiment of the disclosure, the steps of aligning liquid crystal molecules and forming a holding member are switched. A mixture of liquid crystal molecules, first monomers and second monomers is first filled in the space between the first substrate and the second substrate, in which the first monomers are more sensitive to a light of longer wavelength than the second monomers. Next, the space is closed. Then a mask is positioned above the first substrate and the space is exposed to a UV light of longer wavelength through the mask, thereby the first monomers are polymerized to form the holding members in the light shielding regions. Subsequently, an electric field is applied between the counter electrode and the pixel electrodes while the space is exposed to another UV light of shorter wavelength causing the second monomers and remaining first monomers to align the liquid crystal molecules.

Figure 15:
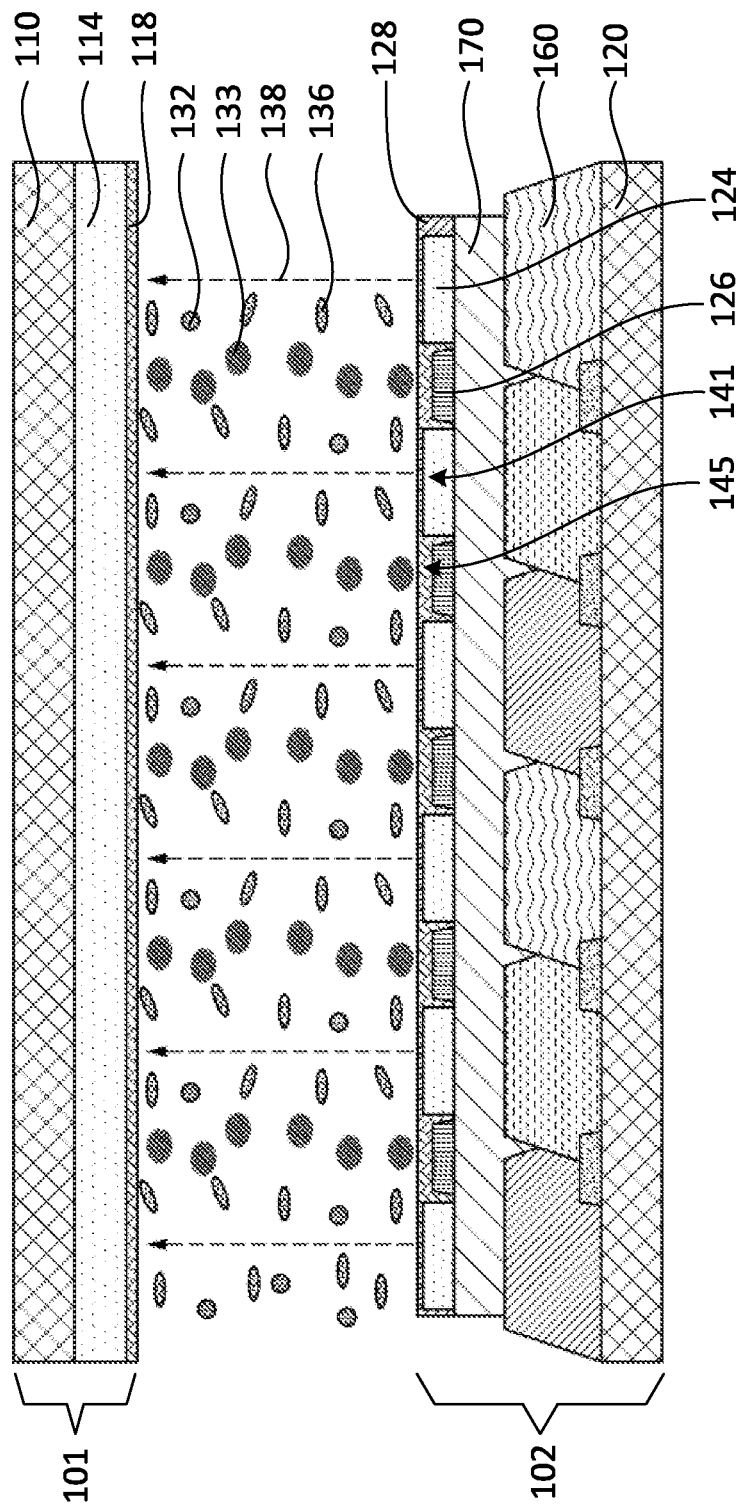
FIGS. 15-17 show schematically a process of fabricating an LCD including pixel structures having a holding member according to yet another embodiment of the present disclosure.
Figure 16:
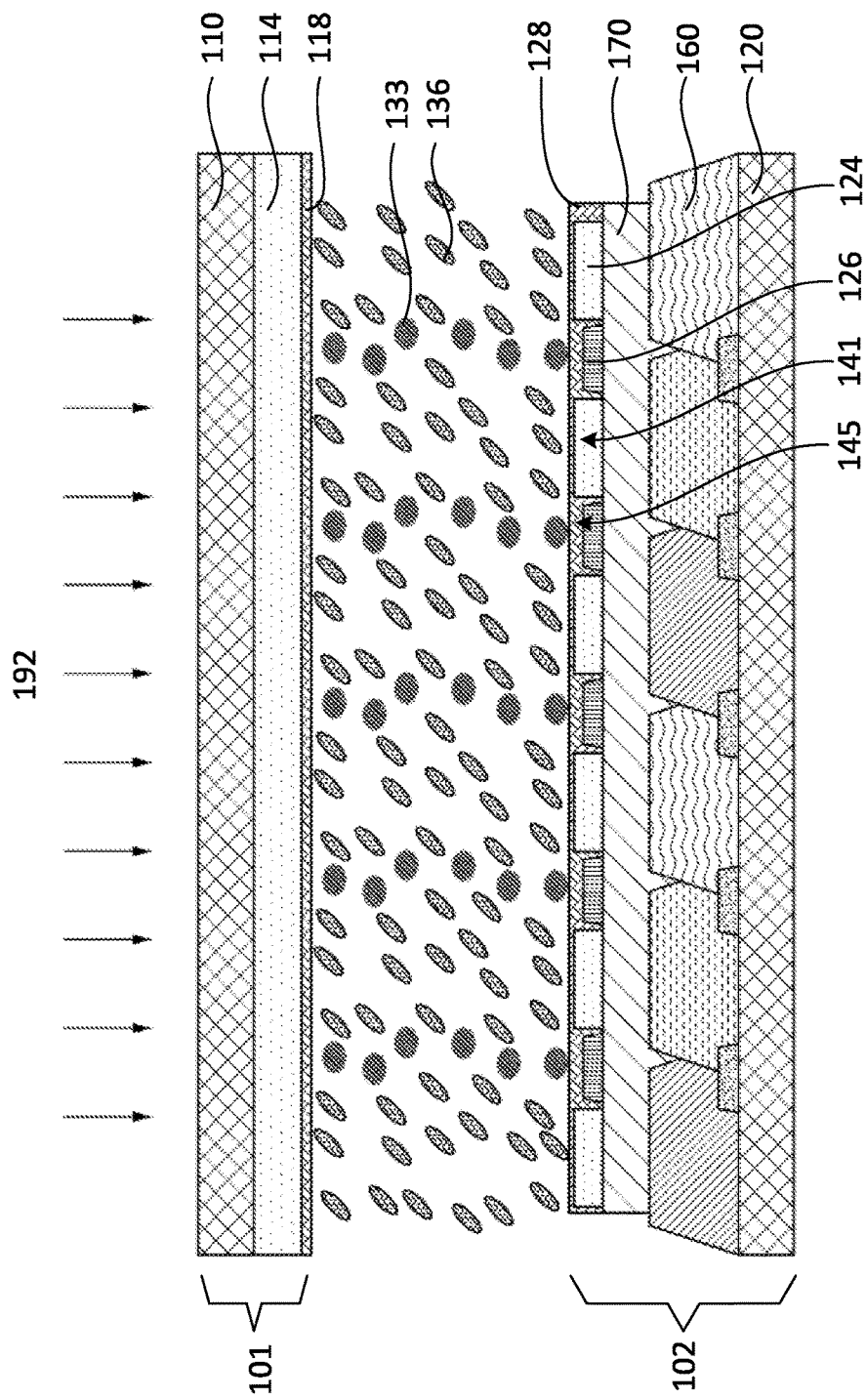
Figure 17:
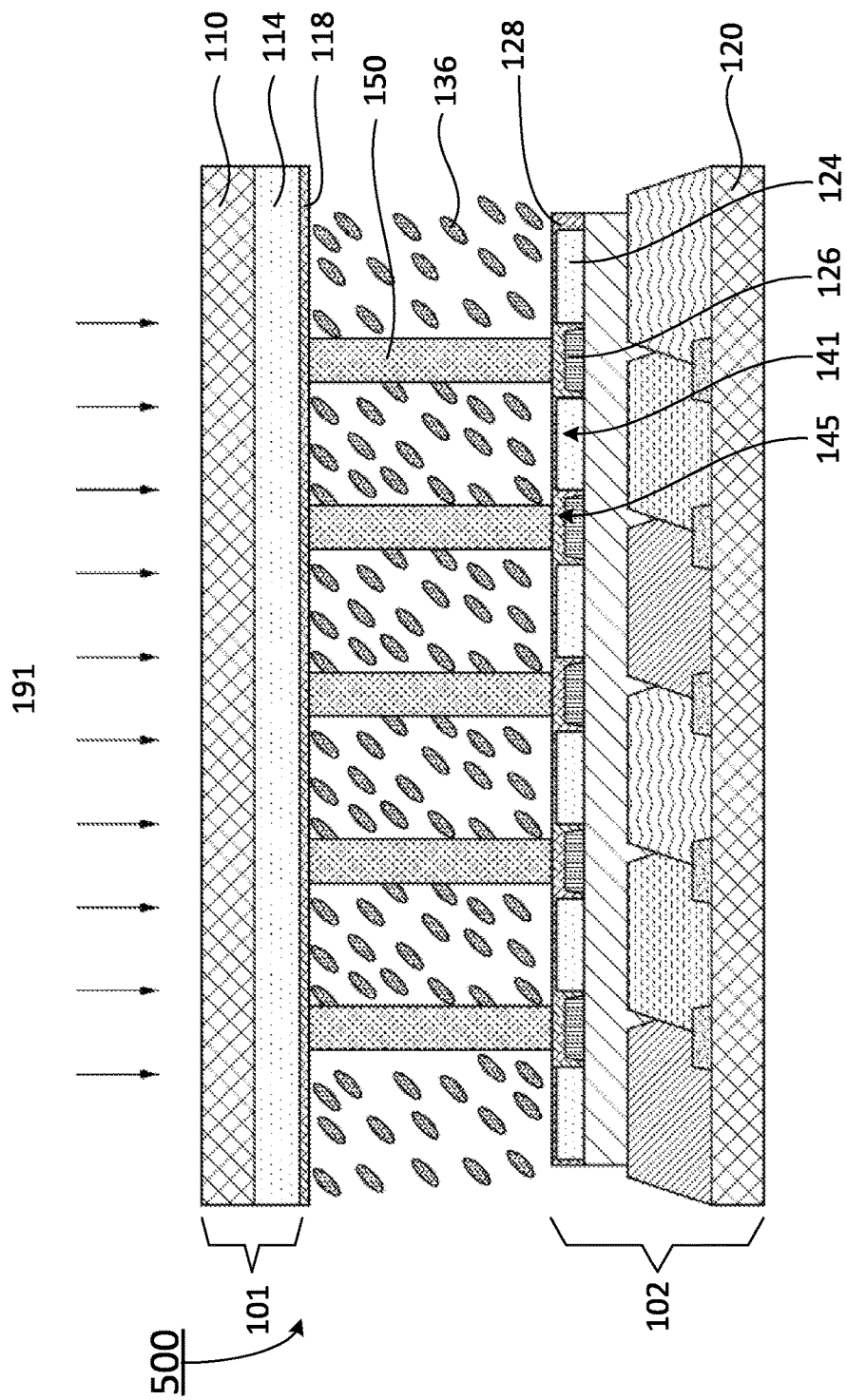

FIGS. 15-17 show schematically the LCD 500 and the process of fabricating the same according to one embodiment of the disclosure. The LCD 500 shown in FIG. 17 is structurally the same as the LCD 600 shown in FIG. 21. The fabricating process of the LCD 500 is similar to that of the LCD 600 shown in FIGS. 18 20 and 21, except that the first monomers 133 are not sensitive to an electric field 138, and thus a mask is not required in order to form the holding member 150 in the light shielding regions 145.

In this embodiment of the fabricating process, an electric field 138 is applied between the counter electrode 114 and the pixel electrode 124 (e.g., the potential difference between the counter electrode 114 and the pixel electrode 124 is 20V) while the space is exposed to a second UV light 192 causing the second monomers 132 to align the liquid crystal molecules 136, as shown in FIGS. 15 and 16. The second monomers 132 may have a structure where no linkage group between a reaction site (e.g., acrylate, methacrylate) and a hard core (e.g., benzene) exists. The second UV light 192 has a wavelength in a range of 320-400 nm, for example, 365 nm.

Referring back to FIG. 15, the application of the electric field 138 is also to move the first monomers 133 to the low field region, i.e., the light shielding region 145 and the liquid crystal molecules 136 to the high field region, i.e., the light transmitting region 141. Next, the liquid crystal layer 130 is exposed to first UV light 191 (without a need of a mask) from the first substrate 101, thereby causing the first monomers 133 and remaining second monomers 132 to be polymerized to form the holding member 150 in the light shielding regions 145, as shown in FIG. 17. The first UV light 191 has a wavelength in a range of 290-320 nm, for example, 313 nm.

In some embodiments, the strengths of the electric field to align the liquid crystal molecules and to separate the monomers for forming the holding member and the liquid crystal molecules are different.

In sum, the method for fabricating an LCD includes the following steps.

At first, a first substrate and a second substrate defining a space therebetween is provided, where the first substrate and the second substrate are configured to have a light transmitting region and a light shielding region.

A mixture of liquid crystal molecules, first monomers and second monomers is then filled in the space between the first substrate and the second substrate.

The space is exposed to a first UV light causing the first monomers to be polymerized to form a holding member in the light shielding region to attach the first substrate and the second substrate. In one embodiment, this exposing step may be performed with a mask.

The space is exposed to a second UV light causing the second monomers to align the liquid crystal molecules.

In one embodiment, the first UV light has a wavelength different from that of the second UV light.

In one embodiment, the wavelength of the first UV light is longer than that of the second UV light and the first monomers are more sensitive to a light of longer wavelength than the second monomers.

In another embodiment, the wavelength of the second UV light is longer than that of the first UV light and the second monomers are more sensitive to a light of longer wavelength than the first monomers.

In one embodiment, the first substrate has a counter electrode and the second substrate has a pixel electrode.

In one embodiment, the method further comprises applying an electric field between the counter electrode and the pixel electrode while exposing the space to the second UV light causing the second monomers to align the liquid crystal molecules.

In another embodiment, before exposing the space to the first UV light causing the first monomers to be polymerized to form the holding member in the light shielding region to attach the first substrate and the second substrate, an electric field between the counter electrode and the pixel electrode is applied in order to move the first monomers to the low field region, i.e., the light shielding region, and the liquid crystal molecules to the high field region, i.e., the light transmitting region.

In another aspect of the disclosure, the method for fabricating an LCD includes providing a first substrate and a second substrate each equipped with an alignment film defining a space therebetween, where the first substrate and the second substrate are configured to have a light transmitting region and a light shielding region and the second monomers are mixed in the alignment layer, filling a mixture of liquid crystal molecules and first monomers in the space between the first substrate and the second substrate, exposing the space to a first UV light causing the first monomers to be polymerized to form a holding member in the light shielding region to attach the first substrate and the second substrate, and exposing the space to a second UV light causing the second monomers to align the liquid crystal molecules.

In the embodiments disclosed above, one or two monomers mixed with the liquid crystal molecules in the liquid crystal layer are utilized to form the holding member that can create a binding force between the top and bottom substrates to prevent the top and bottom substrates from shifting when the LCD is bent. It should be appreciated that other numbers of monomers can also be used to practice the invention.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A pixel structure having a light transmitting region and a light shielding region, comprising:
    a first substrate having a counter electrode;
    a second substrate having a plurality of signal lines, a pixel electrode, a thin-film transistor (TFT), a color filter layer and a bottom black matrix, wherein the color filter layer comprises a plurality of color filters;
    a liquid crystal layer having liquid crystal molecules and formed between the first substrate and the second substrate; and
    a holding member formed in the light shielding region and attached to the first substrate and the second substrate,
    wherein the ratio of a projection area of the holding member to a projection area of the light shielding region is greater than 20%, and
    wherein a projection of the holding member along a direction substantially perpendicular to the second substrate onto the color filter layer covers two adjacent ones of the color filters.

2. The pixel structure of claim 1, wherein the ratio of a projection area of the holding member to a projection area of the light shielding region is greater than 50%.

3. The pixel structure of claim 1, wherein the light shielding region is defined by the bottom black matrix or by the signal lines and the bottom black matrix.

4. The pixel structure of claim 1, wherein the first substrate further comprises a top black matrix.

5. The pixel structure of claim 4, wherein the light shielding region is defined by the bottom black matrix and the top black matrix or by the signal lines, the bottom black matrix and the top black matrix.

6. The pixel structure of claim 1, wherein the holding member comprises a wall-like structure, a column-like structure, or a combination thereof.

7. The pixel structure of claim 1, wherein the holding member comprises a polymer formed by exposing first monomers mixed with the liquid crystal molecules in the light shielding region to a first ultraviolet (UV) light.

8. The pixel structure of claim 7, further comprising an alignment layer, wherein the liquid crystal molecules are aligned by exposing second monomers mixed with the liquid crystal molecules or the alignment layer to a second UV light.

9. The pixel structure of claim 8, wherein the first UV light has a wavelength different from that of the second UV light.

10. The pixel structure of claim 9, wherein one of the first UV light and the second UV light has the wavelength in a range of 320-400 nm, and the other of the first UV light and the second UV light has the wavelength in a range of 290-320 nm.

11. A liquid crystal display, comprising a plurality of pixel structures, each pixel structure is defined by claim 1.

* * * * *